(12) United States Patent
Fisher

(10) Patent No.: US 11,834,092 B1
(45) Date of Patent: Dec. 5, 2023

(54) STROLLER

(71) Applicant: Danyel Fisher, Weatherford, TX (US)

(72) Inventor: Danyel Fisher, Weatherford, TX (US)

( * ) Notice: Subject to any disclaimer, the term of this patent is extended or adjusted under 35 U.S.C. 154(b) by 0 days.

(21) Appl. No.: 17/335,815

(22) Filed: Jun. 1, 2021

Related U.S. Application Data

(60) Provisional application No. 63/032,831, filed on Jun. 1, 2020.

(51) Int. Cl.
*B62B 9/14* (2006.01)
*B62B 9/26* (2006.01)
*B62B 9/20* (2006.01)
*B62B 7/00* (2006.01)

(52) U.S. Cl.
CPC .............. *B62B 9/142* (2013.01); *B62B 7/004* (2013.01); *B62B 9/20* (2013.01); *B62B 9/26* (2013.01); *B62B 2204/02* (2013.01); *B62B 2204/04* (2013.01); *B62B 2301/25* (2013.01)

(58) Field of Classification Search
CPC .. B62B 9/142; B62B 9/20; B62B 9/26; B62B 7/004; B62B 2204/02; B62B 2204/04; B62B 2301/25
See application file for complete search history.

(56) References Cited

U.S. PATENT DOCUMENTS

| | | | | |
|---|---|---|---|---|
| 4,729,572 | A * | 3/1988 | Bergeron | B62B 7/08 280/47.4 |
| 8,256,793 | B1 * | 9/2012 | Krieger | B62B 9/26 280/647 |
| 9,656,682 | B2 * | 5/2017 | Ahlemeier | B62B 9/08 |
| 9,738,300 | B2 * | 8/2017 | Georgiev | B62B 9/00 |
| 9,937,945 | B1 * | 4/2018 | Phillips | B62B 9/102 |
| 10,557,602 | B1 * | 2/2020 | Dejesus | B62B 9/26 |
| 11,008,035 | B1 * | 5/2021 | Walker | B62B 9/08 |
| 11,267,379 | B2 * | 3/2022 | Abreu | B60N 2/5642 |
| 2018/0236913 | A1 * | 8/2018 | Abreu | B60N 2/26 |

FOREIGN PATENT DOCUMENTS

DE 202011050088 U1 * 9/2011 ............ A47C 7/744
WO WO-2017161438 A1 * 9/2017

* cited by examiner

*Primary Examiner* — John D Walters
(74) *Attorney, Agent, or Firm* — Kenneth L. Tolar

(57) ABSTRACT

A stroller includes a support frame mounted on pneumatic tires that allow the stroller to easily traverse irregular or soft terrain. The support frame includes a handlebar assembly having a hammock-style seat mounted thereon. A canopy suspended above the seat contains integral speakers for streaming music from an electronic device and light strings for illuminating a seated child. The seat also includes a heater and a cooling fan for comforting a seated child during extreme temperatures.

9 Claims, 2 Drawing Sheets

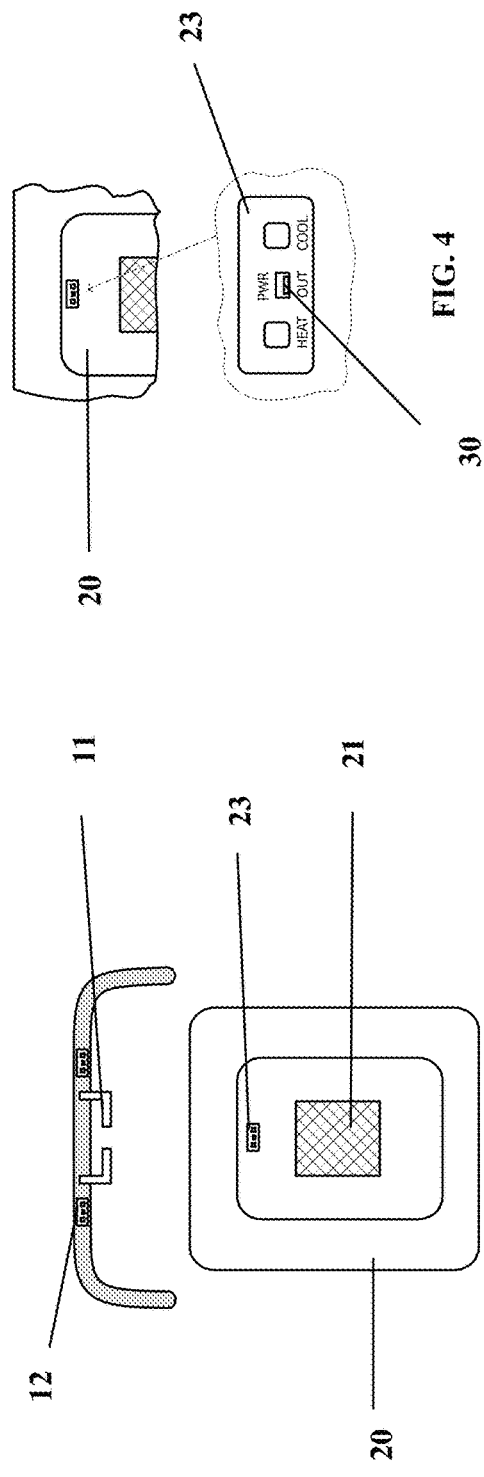
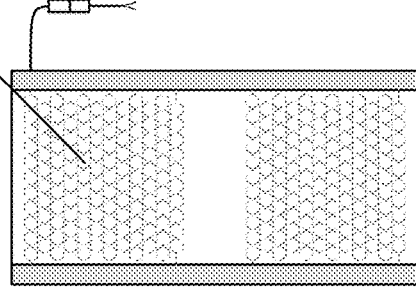
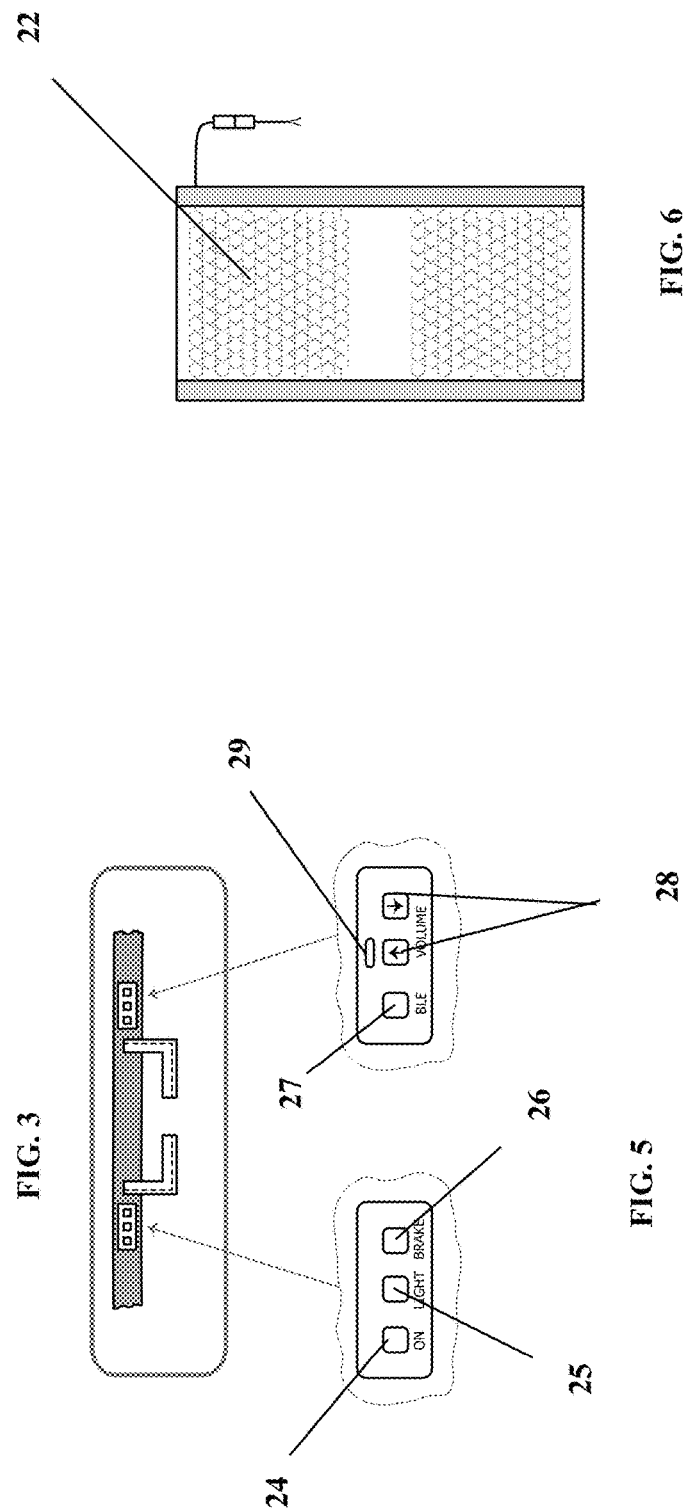

US 11,834,092 B1

STROLLER

CROSS REFERENCE TO RELATED APPLICATIONS

This application claims priority of provisional application No. 63/032,831 filed on Jun. 1, 2020, the specification of which is incorporated herein by reference.

BACKGROUND OF THE INVENTION

The present invention relates to an improved stroller having a climate control system, pneumatic tires for traversing irregular and soft terrain and a music system for entertaining a child.

DESCRIPTION OF THE PRIOR ART

Existing strollers typically include rigid casters that easily bind on irregular or soft terrain. Furthermore, because the passenger seat is exposed, the child can be very uncomfortable on hot or cold days. Conventional strollers do not include integral audiovisual devices requiring a user to also transport other entertainment accessories in addition to the customary infant-care products. Transporting a multitude of items on a conventional stroller is burdensome and inconvenient.

Accordingly, there is currently a need for a stroller that overcomes the limitations of conventional strollers. The present invention satisfies this need by providing an improved stroller having a climate-control system, pneumatic tires for traversing irregular and soft terrain and an integral audio system for entertaining a child.

SUMMARY OF THE INVENTION

The present invention relates to a stroller comprising a support frame mounted on pneumatic tires that allow the stroller to easily traverse irregular or soft terrain. The support frame includes a handlebar assembly having a hammock-style seat mounted thereon. A canopy suspended above the seat contains integral speakers for streaming music from an electronic device and light strings for illuminating a seated child. The seat also includes a heater and a cooling fan for comforting a seated child during extreme temperatures.

It is therefore an object of the present invention to provide a stroller having a climate-control system for comforting a child.

It is therefore another object of the present invention to provide a stroller having pneumatic tires for more easily traversing irregular and soft terrain.

It is yet another object of the present invention to provide a stroller having integral speakers for wirelessly streaming music.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is an isolated, rear view of the seat and handle.

FIG. 4 is an isolated view of the air-handler control panel.

FIG. 5 is an isolated, sectional view of the handle.

FIG. 6 is an isolated view of the seat heater.

DESCRIPTION OF THE PREFERRED EMBODIMENT

Figure 1:
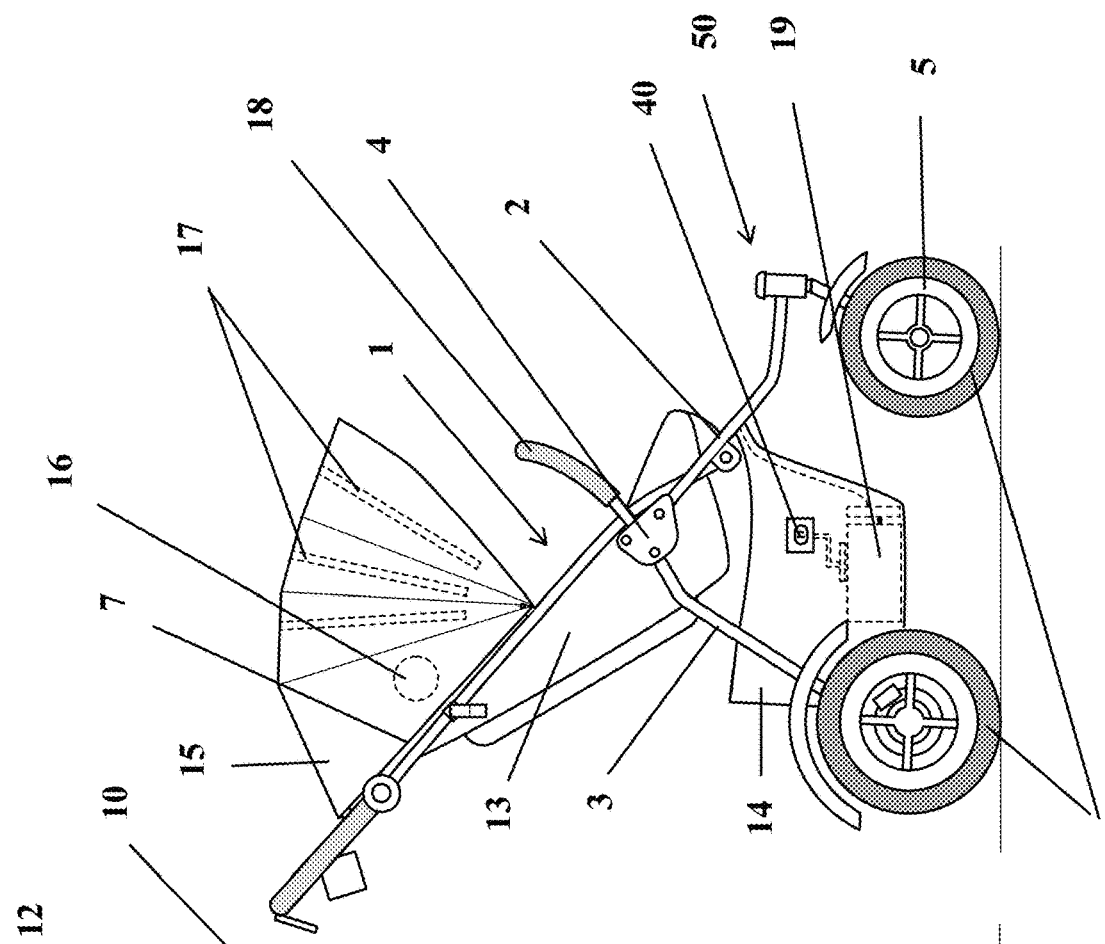
FIG. 1 is a rear, plan view of the stroller according to the present invention.
Figure 2:
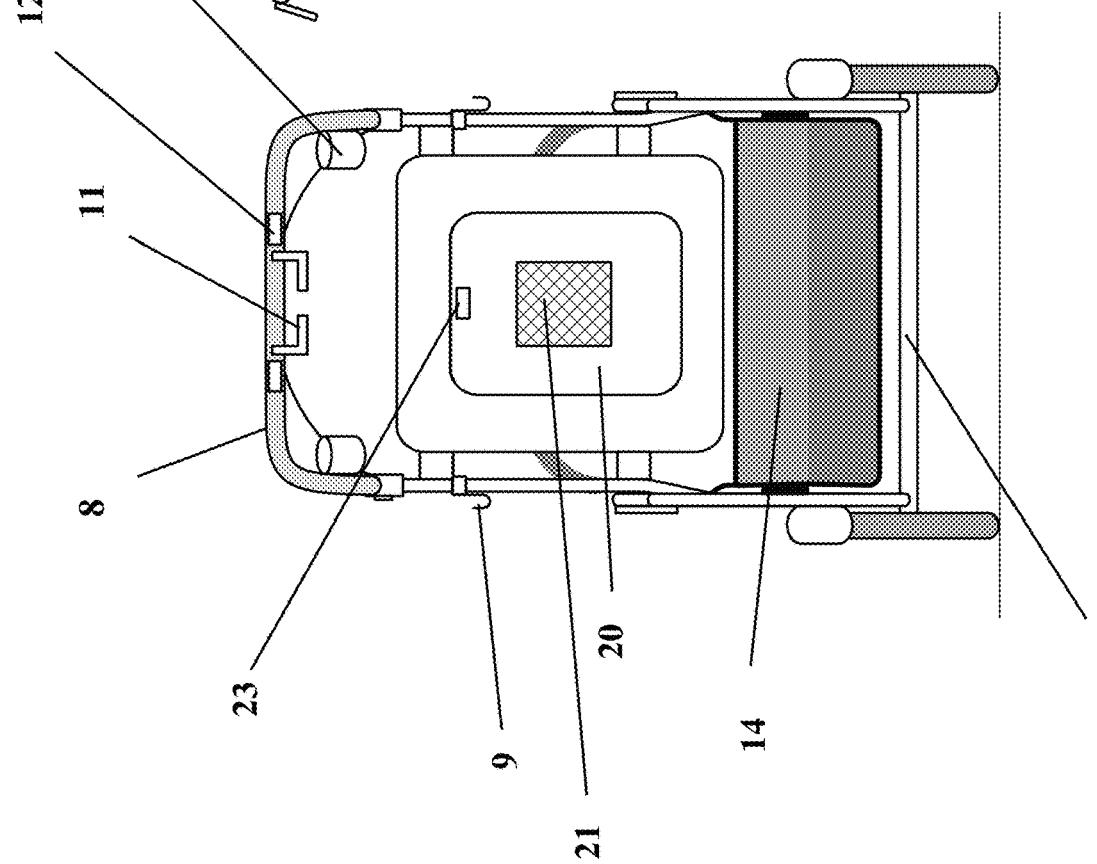
FIG. 2 is a side view of the stroller.

The present invention relates to a stroller comprising a support frame 1 having a lower support structure 50 formed of a pair of front bars 2 and a pair of rear bars 3, each having an upper end and a lower end. The upper ends of the front and rear bars 2,3 are coupled with a bracket 4 that allows the bars 2, 3 to expand and collapse. The lower end of each bar 2, 3 is connected to an axle 4 with a wheel 5 and a pneumatic tire 6 at each of two ends that allow the stroller to traverse both soft and irregular terrain. Each wheel includes ball-bearing swivels that allow the wheels to easily turn regardless of terrain, and an electronically operated disc brake that prevents the stroller from rolling when unattended.

Collapsibly affixed to the front bars is a handlebar assembly including a pair of siderails 7 with a handgrip 8 horizontally extending therebetween. Each siderail includes a hook 9 for suspending a bag or other personal article and a cup holder 10 for supporting beverage containers. The handgrip includes a mobile phone support 11 including a pair of slidable, L-shaped retainers that expand and contract to retain virtually any type of mobile phone. Adjacent the phone are a pair of control panels 12 for operating various electronics described infra.

Suspended from the handlebar siderails is a hammock-style child's seat 13 constructed with a fabric mesh that is comfortable and breathable. Beneath the seat is a fabric accessory basket 14 secured to the support frame for storing and transporting personal items. A collapsible canopy 15 attached to the siderails is superimposed on the child seat for providing shade to the child when positioned in the child seat. Attached to the canopy are a pair of high-fidelity speakers 16 that allow the user to stream music using a mobile phone or another electronic device. Positioned on the inner surface of the canopy are a plurality of LED light strings 17 to illuminate a child within the seat.

Mounted on the support frame in front of the seat is a foam-encapsulated safety bar 18 that a child can grasp for additional security. An accessory bracket (not pictured) can be attached to the safety bar for supporting a tablet computer or a similar electronic device to allow a caregiver to stream videos to the child.

The device further includes a controller 19 having conventional computer hardware, such as an operating system, a memory, a Wi-Fi transmitter, a heater driver, and a fan motor driver. The controller further includes a short-range wireless transmitter, such as that commonly marketed and sold under the trademark BLUETOOTH™. The short-range transmitter allows an electronic device to stream music to a sound system described, infra. The controller further includes specifically configured software that can wirelessly communicate with any desired smart phone. The controller is positioned within the accessory basket and is connected to a recharging port 40 for replenishing a rechargeable battery that powers the controller and the other electronics.

Mounted on the rear surface of the seat is an air handler 20 including a housing having an intake 21 and an internal fan that circulate ambient air through a plenum to the bottom and rear surfaces of the seat. The air handler could also include a Peltier cooler for chilling air distributed by the fan in hotter climates where circulating ambient air is insufficient. The seat also includes an embedded heater 22 that can be activated in cold weather. The heater is constructed with a porous material that allows cooling air to flow freely through the seat when a cooling cycle is in operation. On an upper end of the air-handler housing is a control panel 23 for activating either the heater or cooling fan although the controller will not allow simultaneous operation of both. The control panel 23 also includes a USB port 30 for powering or charging the user's mobile phone.

The handlebar control panels 12 include multiple switches for operating the other electronic components. For example, a first switch 24 powers the electronics, a second switch 25 activates the LED light strings, a third switch 26 activates the disc brakes while a fourth switch 27 activates the Bluetooth™ sound system. Another set of buttons 28 adjusts the audio volume emanating from the speakers. A microphone 29 is positioned above the switches for entering voice commands.

As readily apparent from the detailed description, the improved stroller traverses virtually any type of terrain and includes multiple options for entertaining a child. Moreover, the stroller includes a climate-control system for enhancing the comfort of a child during hot or cold weather.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A stroller comprising:
    a support frame including a handlebar assembly and a lower support structure mounted on a plurality of pneumatic tires;
    a hammock-style child seat mounted on said handlebar assembly, said seat constructed with a breathable fabric mesh;
    a cooling fan mounted on said child seat;
    a fabric accessory basket beneath said child seat for storing and transporting personal items;
    a collapsible canopy attached to said handlebar assembly and superimposed on said child seat for shielding a child seated within the child seat;
    a speaker attached to said canopy, said speaker in wireless communication with a portable electronic device for streaming music;
    a plurality of LED light strings mounted on an inner surface of said canopy to illuminate a child seated within the child seat.

2. The stroller according to claim 1 wherein said seat includes a heater for warming a child during cold weather.

3. The stroller according to claim 2 wherein said heater is constructed with a porous material that allows air from said cooling fan to flow freely through the seat.

4. The stroller according to claim 1 wherein said handlebar assembly includes a hook for suspending a personal article.

5. The stroller according to claim 1 wherein said handlebar assembly includes a cup holder for supporting beverage containers.

6. The stroller according to claim 1 wherein said handlebar assembly includes a mobile-phone support, said mobile-phone support including a pair of slidable, L-shaped retainers that expand and contract to accommodate any size mobile phone.

7. The stroller according to claim 1 further comprising a controller having a wireless transmitter for communicating with a mobile phone or said portable electronic device.

8. The stroller according to claim 7 wherein said controller is positioned within said accessory basket.

9. The stroller according to claim 7 further comprising:
    a battery in communication with said controller;
    a recharging port on said accessory basket and connected to said battery.

\* \* \* \* \*